Oct. 7, 1958

JIRO MUKAI 2,854,890

HIGH APERTURE WIDE ANGLE LENS

Filed Jan. 4, 1956

SPHERICAL ABERRATION

ASTIGMATIC ABERRATION

DISTORTION ABERRATION

INVENTOR.
JIRO MUKAI
BY
ATTORNEY

United States Patent Office 2,854,890
Patented Oct. 7, 1958

2,854,890

HIGH APERTURE WIDE ANGLE LENS

Jiro Mukai, Musashino City, Tokyo, Japan, assignor to Canon Camera Company, Inc., Tokyo, Japan, a corporation of Japan Application January 4, 1956, Serial No. 557,374

Claims priority, application Japan January 14, 1955

2 Claims. (Cl. 88—57)

This invention relates to high aperture wide angle lenses in which major image distortion and astigmatic differences are elimination without introducing an increase in the other abberation as such as is observed and constitute vital defects in the prior known wide angle lenses having a wide aperture of F:1.8.

Figure 1:
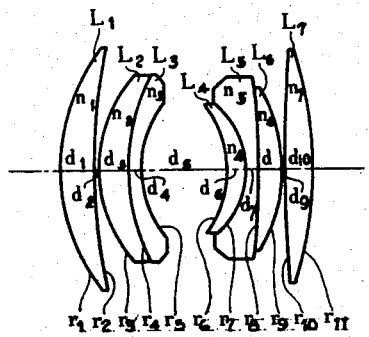
Figure 2:
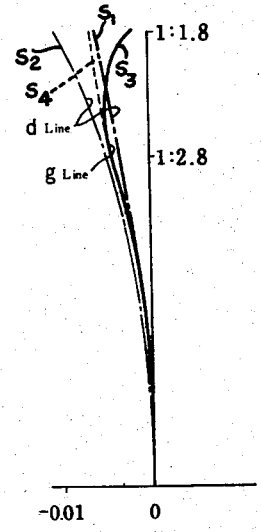
Figure 3:
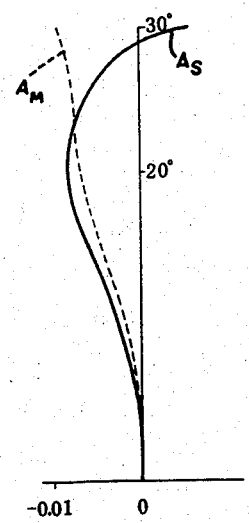
Figure 4:
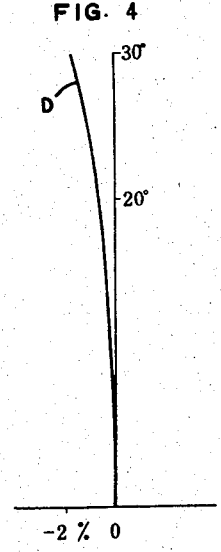

A clearer concept of the scope and purpose of this invention may be obtained from the following description, taken in connection with the attached drawing, in which:

Fig. 1 shows a sectional view of one illustrative embodiment of the wide angle lens having a total angle of sixty degrees with an aperture of F:1.8 according to this invention; and Figs. 2 to 4 inclusive show the aberration graphs spherical, astigmatic and distortional, of the lens of this invention.

The structure of the lens according to this invention comprises four air spaced groups of a total of seven lenses, the first group being a positive meniscus lens $L_1$ positioned with its convex surface towards the object, the second group being a meniscus lens comprising a positive lens $L_2$ and a negative lens $L_3$ cemented together and positioned with its convex surface and cemented surface $r_4$ towards the object, the third group being a meniscus lens comprising three lenses $L_4$, $L_5$ and $L_6$ cemented in the order of positive, negative and positive, positioned with its concave surface towards the object, having $r_7$ of the two cemented surfaces strongly curved towards the object, and the fourth group is a positive convex lens $L_7$. The following conditions must be satisfied by the lenses of the instant invention, where the successive radii of curvature in the direction from the object to the image side are designated by $r$ with an increasing subscript, the axial spacings between lenses by $d$ with similarly increasing subscripts, the indices of refraction of the $d$-lines of the optical glass of the successive lenses by $N$ with similarly increasing subscripts, the dispersive powers of such lenses by $V$ with similarly increasing subscripts, and $f$ the effective focal length of the complete lens array:

(1) $0.3 f < r_3 < 0.45 f$    $0.2 f < r_5 < 0.35 f$
(2) $d_3 + d_4 < 0.13 f$    $0.18 f < d_5 < 0.28 f$
(3) $0.16 f < r_7 < 0.25 f$
(4) $(N_6 - N_5) > 0.08$
(5) $1.6 < (N_1, N_2) < 1.67$    $1.6 < (N_4, N_6, N_7) < 1.72$

In Fig. 2, the heavier chain line $S_1$ is the spherical aberration graph of the spectrum $d$-line, the fine chain line $S_2$ is the graph showing the deviation of the spectrum $d$-line from the sine condition, the heavy solid line $S_3$ the spherical aberration graph of the spectrum $g$-line, and the fine broken line $S_4$ the graph of the deviation of the spectrum $g$-line from the sine condition, of the lenses of the invention. In Fig. 3, the heavy solid line $A_s$ is the graph of the sagital field curvature, and the fine broken line $A_m$ that of the meridional field curvature. In Fig. 4, the heavy solid line D is the graph of the distortion aberration for each angle of incidence.

The specific data for one embodiment of the lens array of the instant invention is:

$[f = 1 \quad 2\alpha = 60° \quad F: 1.8]$

| | | | |
|---|---|---|---|
| $r_1 = 0.579$ | $d_1 = 0.097$ | $N_1 = 1.6584$ | $V_1 = 50.8$ |
| $r_2 = 1.787$ | $d_2 = 0.005$ | | |
| $r_3 = 0.369$ | $d_3 = 0.079$ | $N_2 = 1.6584$ | $V_2 = 50.8$ |
| $r_4 = 0.573$ | $d_4 = 0.032$ | $N_3 = 1.6987$ | $V_3 = 30.1$ |
| $r_5 = 0.267$ | $d_5 = 0.230$ | | |
| $r_6 = -0.297$ | $d_6 = 0.055$ | $N_4 = 1.6204$ | $V_4 = 60.3$ |
| $r_7 = -0.215$ | $d_7 = 0.026$ | $N_5 = 1.5750$ | $V_5 = 41.3$ |
| $r_8 = -3.299$ | $d_8 = 0.069$ | $N_6 = 1.6779$ | $V_6 = 55.3$ |
| $r_9 = -0.422$ | $d_9 = 0.001$ | | |
| $r_{10} = 4.250$ | $d_{10} = 0.083$ | $N_7 = 1.6935$ | $V_7 = 53.5$ |
| $r_{11} = -1.057$ | | | |

In this invention, when the condition of $$0.3 f < r_3 < 0.45 f, \ 0.2 f < r_5 < 0.35 f$$

is given for the meniscus lens group $L_2L_3$ and the index of refraction for the $d$-line of the lenses $L_1$, $L_2$, $L_4$, $L_6$, $L_7$ is given as $1.6 < N_1$, $N_2 < 1.67$, $1.6 < N_4$, $N_6$, $N_7 < 1.72$, the lens array is kept at a Petzval sum of about 0.25, the image is flat and, in addition, the astigmatic difference is less, see Fig. 3. Facing the cemented convex surface $r_4$ of lens group $L_2L_3$ towards the object serves effectively to reduce the chromatic aberration of magnification. By observing the relations $d_3 + d_4 < 0.13 f$ for the thickness of the second group along the optical axis $0.18 f < d_5 < 0.28 f$ for the distance along the optical axis between lenses $L_3$ and $L_4$, and $0.16 f < r_7 < 0.25 f$ for the radius of curvature of the cemented surface of $L_4$, $L_5$, coma aberration around 20° of picture angle in the image field can be minimized. The differences in the indices of the refraction of $d$-line in lenses $L_5$ and $L_6$ should be chosen above 0.08 for the purpose of reducing coma aberration. By so doing, very satisfactory results will be obtained as shown in the aberration graphs of Figs. 2 to 4. Notwithstanding its high aperture of F:1.8, the wide angle objective of the instant invention has a greatly reduced and essentially eliminated image curvature and astigmatic difference as compared to prior known wide angle lens arrays and with the stated advantages does not adversely affect the other aberrations.

What I claim is:

1. A high aperture wide angle photographic objective of seven lenses divided into four groups air-spaced from each other comprising a first positive meniscus lens with its convex surface facing the object side of the objective, the second group is a second positive meniscus lens and a first negative meniscus lens cemented to each other with the cemented convex surfaces thereof facing such object side, the third group is a third positive meniscus lens, a second negative meniscus lens, and a fourth positive meniscus lens cemented at the adjacent faces and with the concave surface of the third group toward such object side, and the fourth group is a bi-convex lens, in which the radii of curvature $r$ subscript of the individual lens surfaces in succession from the object side of the objective, the distances $d$ subscript along the optical axis of the lens thicknesses and air spacings, and the refractive indices $N_{subscript}$ of the $d$-line of the individual lenses, satisfy the relations:

$$0.3 f < r_3 < 0.45 f$$
$$0.2 f < r_5 < 0.35 f$$
$$d_3 + d_4 < 0.13 f$$
$$0.18 f < d_5 < 0.28 f$$
$$0.16 f < r_7 < 0.25 f$$
$$(N_6 - N_5) > 0.08$$
$$1.6 < (N_1, N_2) < 1.67$$

and $$1.6 < (N_4, N_6, N_7) < 1.72$$

where $f$ is the effective focal length of the entire objective.

2. A high aperture wide angle photographic objective of seven lenses air spaced into four groups comprising a first positive meniscus lens of which the convex surface faces the object side of the objective, a second positive meniscus lens is cemented to a first negative meniscus lens to constitute the second group of which the cemented convex surfaces face such object side, a third positive meniscus lens is cemented to a second negative meniscus lens which in turn is cemented to a fourth positive miniscus lens to constitute the third group of which the concave surface and the cemented interface of the second negative and the fourth positive meniscus lenses are toward such object side, and a first biconvex lens in which the radii of curvature, $r_{subscript}$, of the individual lens surfaces in succession from the object side of the objective, the distances, $d_{subscript}$, along the optical axis of the lens thicknesses and the air spacings, and the refractive indices, $N_{subscript}$, of the $d$-line and the dispersion factors, $V_{subscript}$, of the individual lenses, are:

[$f=1.00$   F:1.8   Including angle=60°]

| Lens | Radii $r$ | Thicknesses and Distances $d$ | N | V |
|---|---|---|---|---|
| $L_1$ | $r_1 = 0.579$ | $d_1 = 0.097$ | $N_1 = 1.6584$ | $V_1 = 50.8$ |
|  | $r_2 = 1.787$ | $d_2 = 0.005$ |  |  |
| $L_2$ | $r_3 = 0.369$ | $d_3 = 0.079$ | $N_2 = 1.6584$ | $V_2 = 50.8$ |
| $L_3$ | $r_4 = 0.573$ | $d_4 = 0.032$ | $N_3 = 1.6987$ | $V_3 = 30.1$ |
|  | $r_5 = 0.267$ | $d_5 = 0.230$ |  |  |
|  | $r_6 = -0.297$ |  |  |  |
| $L_4$ |  | $d_6 = 0.055$ | $N_4 = 1.6204$ | $V_4 = 60.3$ |
|  | $r_7 = -0.215$ | $d_7 = 0.026$ |  |  |
| $L_5$ |  |  | $N_5 = 1.5750$ | $V_5 = 41.3$ |
|  | $r_8 = -3.299$ | $d_8 = 0.069$ |  |  |
| $L_6$ |  |  | $N_6 = 1.6779$ | $V_6 = 55.3$ |
|  | $r_9 = -0.422$ | $d_9 = 0.001$ |  |  |
|  | $r_{10} = 4.259$ |  |  |  |
| $L_7$ |  | $d_{10} = 0.083$ | $N_7 = 1.6935$ | $V_7 = 55.3$ |
|  | $r_{11} = -1.057$ |  |  |  |

References Cited in the file of this patent

UNITED STATES PATENTS

| | | |
|---|---|---|
| 2,130,760 | Warmisham | Sept. 20, 1938 |
| 2,389,016 | Wynne | Nov. 13, 1945 |
| 2,611,295 | Schade | Sept. 23, 1952 |
| 2,645,973 | Ito | July 21, 1953 |

FOREIGN PATENTS

| | | |
|---|---|---|
| 323,138 | Great Britain | Dec. 24, 1929 |